United States Patent
Wijnstra

(10) Patent No.: US 7,231,641 B2
(45) Date of Patent: Jun. 12, 2007

(54) X-RAY EXAMINATION APPARATUS CONTAINING A SHARED SOFTWARE MODULES AND AN APPLICATION TO ACCESS SOFTWARE MODULE SERVICES

(75) Inventor: Jan Gerben Wijnstra, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 480 days.

(21) Appl. No.: 09/801,621

(22) Filed: Mar. 8, 2001

(65) Prior Publication Data
US 2001/0039599 A1 Nov. 8, 2001

(30) Foreign Application Priority Data
Mar. 9, 2000 (EP) ................................ 00200855

(51) Int. Cl.
*G06F 9/00* (2006.01)
*G06F 15/16* (2006.01)

(52) U.S. Cl. ........................ 719/316; 709/203; 702/91

(58) Field of Classification Search ................ 709/310, 709/200–205, 315–317, 217–226; 719/310–318, 719/327, 328, 331, 332; 717/100–105, 116; 702/91, 8; 710/302
See application file for complete search history.

(56) References Cited

U.S. PATENT DOCUMENTS

| | | | | |
|---|---|---|---|---|
| 5,257,369 A | * | 10/1993 | Skeen et al. ................ | 719/312 |
| 5,710,896 A | * | 1/1998 | Seidl ......................... | 715/744 |
| 6,339,832 B1 | * | 1/2002 | Bowman-Amuah ......... | 714/35 |
| 6,350,239 B1 | * | 2/2002 | Ohad et al. ................. | 600/437 |
| 6,438,594 B1 | * | 8/2002 | Bowman-Amuah ........ | 709/225 |
| 6,442,748 B1 | * | 8/2002 | Bowman-Amuah ........ | 717/108 |
| 6,477,580 B1 | * | 11/2002 | Bowman-Amuah ........ | 709/231 |
| 6,477,665 B1 | * | 11/2002 | Bowman-Amuah .......... | 714/39 |
| 6,496,850 B1 | * | 12/2002 | Bowman-Amuah ......... | 709/203 |
| 6,529,909 B1 | * | 3/2003 | Bowman-Amuah .......... | 707/10 |
| 6,532,465 B2 | * | 3/2003 | Hartley et al. ................ | 707/10 |
| 6,631,122 B1 | * | 10/2003 | Arunachalam et al. ..... | 370/332 |
| 6,898,791 B1 | * | 5/2005 | Chandy et al. ............. | 719/314 |
| 6,961,687 B1 | * | 11/2005 | Myers et al. .................. | 703/6 |
| 2003/0058277 A1 | * | 3/2003 | Bowman-Amuah ......... | 345/765 |
| 2003/0186228 A1 | * | 10/2003 | McDevitt et al. .............. | 435/6 |

OTHER PUBLICATIONS

Java 2 Platform, Enterprise edition, J2EE, Sun Microsystems, Dec. 17, 1999.*
S. Vinoski, "COBRA Integrating Diverse Applications Within Distributed Heterogeneous Enviroments", IEEE Communications Magazine, IEEE Service Center, Piscatawa, NJ, US, vol. 35, No. 2, Feb. 1, 1997, pp. 46-55, XP000683401.
Z. Yang ,et al, "COBRA: A Platform for Distributed Object Computing (A State-of-the-Art Report on OMG/CORBA)" Operating Systems Review (SIGOPS), ACM Headquarter, New York,US, vol. 30, No. 2 Apr. 1996, pp. 4-31, XP000585086.
F. J. Van Der Linden et al, "Creating Architectures With Building Blocks", IEEE Software, Online, vol. 12, No. 6 Nov. 1995, pp. 51-60,XP0001020426.
F. Van Der Linden et al, "Composing Product Families From Reusable Components", Proceedings of the 1995 International Symposium and Workshop on Systems Engineering of Computer Based Systems, Tucson,AZ,US, IEEE, Los Alamitos, US 'Online!,Mar. 1995, pp. 35-40, XP002176701.

* cited by examiner

*Primary Examiner*—John Follansbee
*Assistant Examiner*—Haresh Patel

(57) ABSTRACT

A family of complex systems has a shared family architecture. A component framework supports participating plug-in components. Individual plug-in components provides one or more services. The component framework defines roles providing one or more common interfaces for services of several plug-in components. Notably, the component framework includes an inventory function for assessing available services in the participating plug-in components.

5 Claims, 1 Drawing Sheet

X-RAY EXAMINATION APPARATUS CONTAINING A SHARED SOFTWARE MODULES AND AN APPLICATION TO ACCESS SOFTWARE MODULE SERVICES

CROSS-REFERENCE TO RELATED APPLICATIONS

This application claims priority from European Patent Office application EP 00200855.5 filed Mar. 9, 2000.

BACKGROUND OF THE INVENTION

1. Field of the Invention

The invention relates to a family of complex systems with a shared architecture.

Such a family of complex systems is known from the article '*Creating architectures with building blocks*' by F. J. van deer Linden and J. K. Miller in IEEE Software 12(1995) 51–60, which is hereby incorporated by reference as background material. As described in the article, rather than creating a single product, a product family are based on a general understanding of product variations rather than precise product definitions, which are not available from the beginning. The objective is to enable people who are not experts in the problem domain to configure concrete products according to a part list. In order to create a parts list, both hardware and software components must be pre-manufactured and place in an archive, ready for use. The system is constructed along three design dimensions covered by the system architecture: structure, aspects and behavior. The structure determines the system's decomposition into parts. Aspects model the functional decomposition of the system. Behavior deals with processing that place within the system. In particular, the structure is considered the most important and is organized into four layers, or subsystems. These subsystems are composed of software modules that are building blocks and comprise the basic software entities in the system architecture. Building blocks, although being software, resemble hardware components by being pre-manufactured components. Each building block resides in a particular layer and imports building blocks from lower layers. Thus, one can build different systems using the same collection of lower layer building blocks. For configurability purposes, when a card type is added or removed, the corresponding control software must be adapted to the new situation, such as by adding or removing building blocks.

A shared family architecture is based upon a skeleton of generic building blocks of software, that are present in most or all of the systems in a particular family. As disclosed in "*Composing Product Families from Reusable Components*" by F. L. van deer Linden and J. K. Miller in IEEE Software 0-7803-2531-1/95, pages 35–40 (IEEE 1995), which is herein incorporated by reference as background material, each family may have a large variety of s systems, with each particular variety being adapted to certain user needs blocks that forms a system family and the relationship between the building blocks are determined. The basic architecture of the family includes generic building blocks that define abstract behavior, and their mutual relationships. With regard to software components, just as hardware boards can be plugged into a system board without much detailed know-how, the software is pluggable too. The software should consist of plug-in units that extend the system by some meaningful functionality, also referred to as a service, and the hardware configurability imposes a minimum condition for the configurability of the software components. A component framework is a skeleton of software architecture that can receive plug in software components providing one or more functions, also referred to as services. The component framework/skeleton defines roles, aka protocols including interfaces through which the services of the plug-in software components can be accessed.

2. Description of the Related Art

The known family of complex systems is in fact a family of telecommunications switching systems. The family members have a common software architecture. The common software architecture enables software development and testing to be shared among family members.

SUMMARY OF THE INVENTION

An object of the invention is to provide a family of complex systems in which a relative large degree of diversity among present and/or future family members is supported by the common software architecture.

This object is achieved according to the invention by a family of complex systems wherein a component framework supports participating plug-in components individual plug-in components provides one or more services and the component framework defines roles providing one or more common interfaces for services of several plug-in components.

The roles provide for common interfaces between the services of the plug-ins and clients which use the services offered by the plug-ins. The invention notably achieves advantages for systems that have some degree of complexity such that a software architecture platform is usually employed in order to drive and control the complex system. The advantages of a family of complex systems according to the invention are more marked as the systems are more complex, but the invention may also be advantageously employed in the software architecture of relatively simple systems.

Usually, the clients are formed by functionalities of the complex system, which indirectly serve commands supplied by the user of the complex system. The clients may also be direct actual users. Clients use the services from the plug-ins by accessing the component framework. The component framework according to the invention is itself active in setting up roles, i.e. common interfaces for services of several plug-ins. This achieves that the client is not involved in the structures of the component framework. Notably this is achieved because the functionalities offered by plug-ins are modelled as services and common functional concepts of the plug-ins are combined at their own roles. According to the invention the component framework provides a central access without revealing specific configurations to the client. Thus, diversity e.g. in future generations of the family is widely supported. In this respect it is to be noted that the family of complex systems may share the component framework. Various different members of the family are formed by coupling different plug-ins to the shared component framework. A next plug-in may be inserted without difficulty as its services may be interfaced to the client via the already existing roles. This makes it easier to create a new family member which has, with respect to the existing family, one or more new plug-ins with their services. According to the invention the services of the new plug-in are interfaced to the client via roles that are shared with service of earlier plug-ins. Alternatively, the component framework allows easy set-up of new roles for the service of the new plug-ins without substantial redesign of the component framework. Preferably when setting-up roles the expected diversity of new plug-ins is carefully analysed so that the setting-up of new roles remains limited.

In a particular example, the present family member is an diagnostic imaging system of which the components such as the x-ray source, the x-ray detector, the stand carrying the x-ray source and the x-ray detector and the patient table are moveable. The respective components give rise to software plug-ins which control the respective services relating to individual movements of these components. These plug-ins are all interfaced to the component framework by way of one role relating to movements. In a next generation for example an ultrasound imaging modality is incorporated in the medical diagnostic system. In this next generation diagnostic imaging system an additional movement, namely movements of an ultrasound transducer are involved. The software plug-in for supporting and controlling the movements of the ultrasound transducer are easily interfaced to the already existing role. The component framework then is immediately able to detect and initialise services involving the additional movement of the ultrasound transducer.

Within a generation of complex systems, notably medical diagnostic systems, respective family members include high-end and low-end version of a common functionality. For example respective x-ray examination apparatus may have either a high-end patient table which allows many complication movements or a low-end patient table which only allows a few simple movements. The software plug-ins relating to either high-end or low-end versions are interfaced to the same role. Hence, according to the invention, the software architecture having the component framework supports the entire range from high-end to low-end of the common functionality.

These and other aspects of the invention are further elaborated with reference to the preferred embodiments as defined in the dependent Claims.

According to the invention one or several component frameworks may be employed in a complex system. Notably, separate component frameworks may be employed for respective aspects of use and control of the complex system at issue, particular examples are an application component framework which deals with the application domain, such as procedures for acquiring images in a medical diagnostic system. There may also be a technical component framework which deals with control of the hardware, such as the geometry functionalities of an x-ray examination apparatus. Further, an infrastructure component framework which is related to computing platforms of the complex system. The infrastructure component framework is useful for dealing with field-service related functions, such as calibrations and settings.

Preferably, the individual complex systems, being a member of the family as defined in Claim 1, include an inventory function in the component framework. The inventory function assesses the actually available services from the plug-ins for this individual complex system. Thus, the inventory function provides an availability interface through which clients can determine which functionalities can be realised. This further achieves that the component framework acts as a central access point for the functionalities supported by the available services. The assessment of available services may be performed when the complex system is started-up, but regular updates of the assessment may also be performed either during operation of the complex system or when a new plug-in is added to the complex system.

Preferably, the component framework is active in that the available services are correctly initialised when the complex system is switched-on or regular updates are performed. In this way the correct initialisation of the complex system is done consistently for most or even all features the complex system. As to regular updates the component framework provides an infrastructure for the plug-ins. When a new plug-in is added, only the component framework needs to perform an update of the available services.

An easy to assess the available services from the plug-ins coupled to the component framework is to maintain a list of the services with their properties and requirements. Such a list is preferably in digital electronic form. Preferably, the component framework generates, updates and store this list of available service. Advantageously, the list of services is provided in the form of a distributed set in which services of one or more plug-ins are assigned identifiers depending on the behaviour of the services; thus, services having the same behaviour are assigned to the same identifier and services having different behaviour are assigned to different identifiers. The distributed set further accounts for which plug-ins and services are available. Because the distributed set resides in the component framework, the location of the service is of no concern to the client service.

BRIEF DESCRIPTION OF THE DRAWINGS

These and other aspects of the invention are further elaborated by way of example with reference to the detailed embodiments discussed hereinafter and with reference to the accompanying drawing wherein.

DETAILED DESCRIPTION OF THE INVENTION

Figure 1:
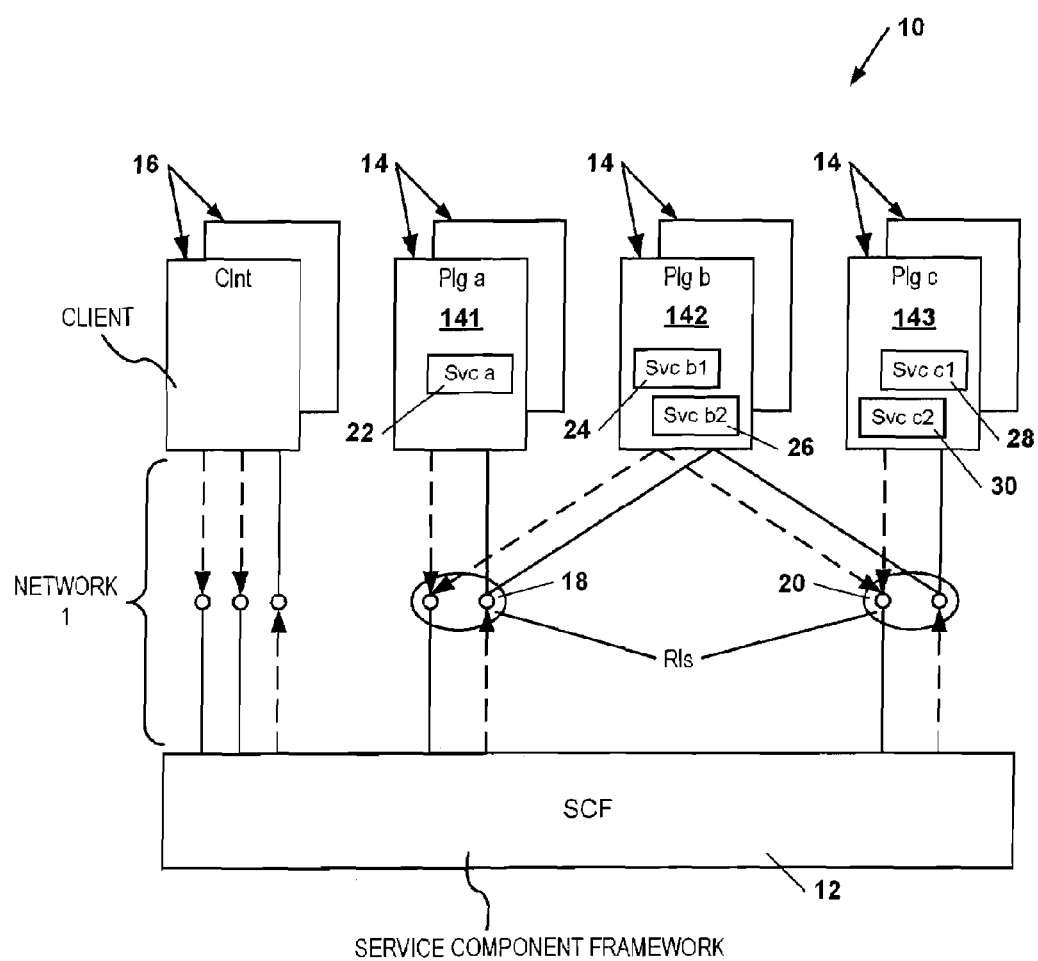
FIG. 1 shows a diagrammatic software architecture representation of a medical diagnostic system 10 having a software component 'Service Component Framework' (SOF) 12, wherein the service component framework 12 is configured for actively connecting software component Plug-ins 14 and Clients 16.

The component framework 12 according to the invention is a software component itself (i.e., embodied in a computer readable medium), which is indicated as a service component framework (SCF), and defines one or more roles (Rls) (for example, as indicated by reference numerals 18 and 20) to which one or more software components (Plg a, Plg b, Plg c), as indicated by reference numerals 141, 142, and 143, respectively, can be plugged-in. These The software component plug-ins 14 provide some kind of service (Svc a1–Svc c2) via their interface, which wherein a plug-in can range from a software representation of a scarce hardware resource, e.g. image processing nodes which provide services like noise reduction or image subtraction, to some piece of logical functionality, e.g. a spelling checker. This means that a software component plug-in 14 contains is a container of one or more services (i.e., one or more functionalities specific to the corresponding plug-in). For example, as illustrated in FIG. 1, plug-in 141 (Plg a) contains a service 22 (Svc a). Plug-in 142 (Plg b) contains two services (Svc b1) and (Svc b2), indicated by reference numerals 24 and 26, respectively. Plug-in 142 contains two services (Svc c1) and (Svc c2), indicated by reference numerals 28 and 30, respectively. In addition to the plug-ins 14, there are clients 16 that use the functionality provided by the component framework 12 and plug-ins 14 as a whole, via a suitable connection, for example, computer or network connection 1. The service component framework 12 is configured for actively connecting interfaces of plug-ins 14 and providing via the respective roles (18,20), the functionality of these interfaces to other clients 16.

For example, for the geometry sub-domain of a family of X-ray diagnostic systems such a service component framework has been developed. The geometry sub-domain e.g. involves the functionalities of the possible movements, rotations displacements of components of the X-ray system, such as the movements of the X-ray source and X-ray detector, patient table and the stand which carriers the X-ray source and X-ray detector In the family architecture, geometry has been identified as a unit. This unit as a whole provides, amongst others, a number of movements to position the patient, like TableHeight and TiltTable. Various geometry hardware modules exist, each providing a subset of all possible movements (e.g. about 100 movements in total). To deal with this diversity the hardware model is mirrored into software by one framework component, which provides the generic functionality, and a number of plug-ins, each providing a number of movements to the framework component. In this example, the movements are thus modelled as the services that are provided by the plug-ins. The various clients of this component framework can use these movements without worrying about the internal component framework structure. This kind of framework has also been applied for other sub-domains of the product family, e.g. in acquisition for adding acquisition procedures, in reviewing for adding analytical functions, and in the field-service domain for field-service functions (calibration, configuration, etc.).

The main advantage provided according to the invention of the service component framework is related to the degree in which the functionality of the sub-domain that is involved can be standardised and modelled as services, and the support for diversity that is needed. In case of the geometry example the movements are identified as the main concepts, and these can be handled as services provided by plug-ins that match the hardware modules.

Two important issues concerning the service component frameworks are the responsibilities that the framework component has, and the abstractions and interfaces that the plug-ins must provide. These two issues are discussed hereinafter.

When defining a service component framework, a number of responsibilities are advantageously taken into account for the framework component, viz.:

Provide a Support for Diversity
An important responsibility of the framework component is to support diversity. This means that the framework component supports easy pluggability. For this, it is important that the (expected) forms of diversity are carefully analysed and the right concepts are selected, in the geometry example the movement concept. This is closely related to the interface issues, discussed later on.

Provide a Central Access Point
Since it enables diversity and because this diversity preferably does not propagate through the entire system, a framework component serves as a central access point for the functionality provided by the plug-ins without revealing the specific configuration of the plug-ins to the clients of this functionality. An important activity here is maintaining a list of all available services, which are actually located in the plug-ins. In the geometry example, the movements are identified via a character string, describing the kind of movement, e.g. TableHeight, TiltTable, etc.

Provide a Basic Infrastructure
Individual plug-ins preferably do not directly interact with parts of the system that may vary over time. Instead, the framework component provides some kind of infrastructure to the plug-ins. This way, when the environment changes, only the framework component needs to be updated. Such an infrastructure is for example responsible for correctly initializing all plug-ins and their services.

Provide Functionality
Next to the basic responsibilities mentioned above (connection management and infrastructure), the framework component may also contain additional functionality, since it is a component of its own. This is for example the case for the geometry unit where the framework component is responsible for adding resource management and scheduling in order to deal with the scare movements in a controlled way. Another possibility is that the framework component already contains some services and can operate on its own, so that adding plug-ins to that framework is not mandatory.

The main responsibility of the plug-ins is to provide the functionality (services) to the framework component. This may occur at initialisation-time of the system or during run-time when the service is actually needed. The architectural concepts, interfaces, and infrastructure to which the plug-ins must adhere to are defined by the component framework.

Since component frameworks are introduced to deal with diversity, they advantageously are able to deal with various plug-ins providing their own specific functionality. This functionality is handled by the component framework in a generic way and provided to interested clients. This means that the right abstractions must be chosen both for the interface between the plug-ins and the component framework and between the component framework and its clients.

The roles acting as interfaces, are on the one hand clear and straightforward to use, and on the other hand that they are stable.

For the movements in the geometry example, several interfaces are chosen, each representing one group of movements, making the interface more specific and easier to use. In this case, the semantics are stable (a movement is a known concept in the domain), but the syntax may slightly change in the future.

When defining a unit or a component in the system, a deliverable is provided to support the clients using this unit or component. This deliverable is called the requirements specification. A requirements specification specifies the interface that is provided to the clients. It contains, amongst others, the following parts:

Class Diagrams
These diagrams contain the interface classes that the unit/component provides to its clients. The classes in a class diagram are related to each other via associations, aggregations, and generalisations. Each diagram has an annotation, describing the group of classes as a whole.

Sequence Diagrams
A sequence diagram represents an interaction, which is a set of messages exchanged among objects within a collaboration to effect a desired operation or result. In this context, the sequence deals with the interaction between the unit/component and its users. A sequence diagram contains a possible sequence of events, and is thus not complete in that sense.

Class Descriptions

For each class, a description is made. This description is based on the model laid down by the class diagrams. For each class, the attributes, operations, and state diagram can be specified.

Software Aspects

Special attention is paid to the various software aspects as identified by the architect that cut across most software components, like initialization, error handling, graceful degradation, etc. These aspects are related to the quality attributes. For each relevant aspect a separate section is identified.

The interface of a unit/component is described based on a UML model with classes and associations. When dealing with component frameworks, some additional issues preferably are taken into account. For example the geometry unit consists of a service component framework with a number of plug-ins. In this case, the functionality provided by the geometry unit as a whole in a specific family member cannot be given by one document. Instead, two document types are used, viz.:

Generic Requirements Specification

This requirements specification describes the generic interfaces that are provided to the clients. All service concepts, in this case the various types of movements, their attributes, etc. are described in this document. However, no specific services (instances) are described.

Specific Requirements Specification

Individual plug-ins provide their own specific requirements specification. This requirements specification describes which services are provided and which specific properties the plug-in has. For each movement, amongst others, the MaximumPosition and MaximumSpeed need to be specified. The generic requirements specification focuses on the generic meaning of the service interfaces, whereas the specific requirements specifications deal with service specific issues.

Next to the pluggability of the actual software component plug-ins, it is also important to have this pluggability on document level, as described above. This makes it easier to determine the complete requirements specification for a specific family member, since each plug-in has a related document describing the specific services of that plug-in. This agrees with the idea that a component is the unit of packaging, i.e. a component consists not only of executable code, but also of its interface specifications, its test specifications, etc.

A component framework defines the boundary conditions to which each plug-in must adhere. Since usually several plug-ins are developed for a framework, it is worthwhile to provide support for plug-in development, This is achieved in that a documentation template is provided for the specific requirements specifications. This way, the author knows what needs to be specified, and all relevant issues are addressed.

The interfaces and design of a component framework dictates the design of the plug-ins. That is why also support can be given for the design documentation of plug-ins.

The interface files of the interfaces that the plug-in needs to support must be provided. Furthermore, some classes that are relevant for each plug-in can be provided. It is also possible to provide a complete example plug-in, containing all relevant information to an implementer of a plug-in.

Further, a test specification is preferably provided against which each plug-in can be tested. It is even possible to provide some test harness in which these tests can be performed automatically.

As stated before, the product family architecture does not show diversity on the level of units. This means that the units form a stable skeleton of the system. The diversity can be found inside the units. One of the means to deal with this is to divide the unit model into a generic part (related to one or more component frameworks) and a specific part (the plug-ins). Each unit has a part of the overall domain model assigned to it as a starting point for the design activities. A number of steps in this iterative modelling process can be identified (using the geometry example):

1. The design activity adds design classes to the assigned domain model, e.g. a manager class maintaining a list of all movements is introduced, and a priority based scheduler class is added for handling the scarce movement resources.
2. Then the commonality and diversity is analysed. This is closely related to the diversity in features and realisation techniques that the product family must support. Identify which part of the model remains stable, and which part will vary between the family members and in time. The larger the selected generic part, the less the resulting flexibility is.
3. Based on the previous analysis, it must be identified which concepts must be used for the services that the plug-ins should provide to the component framework. For the example, the movements are selected as the services. It may be the case that by introducing generic concepts, the variation can be handled better (these concepts may even be useful in the domain model). For example, various specific parts of a geometry have specific position information. By introducing a concept like a GeometryComponent class containing position information, this information can be handled in a generic way.
4. Identify which additional design concepts are needed by splitting the model up into two parts, i.e. the framework component and the plug-ins. This splitting up has more consequences for component frameworks than for example for class frameworks, where techniques like inheritance are also allowed. For example, the generic part gets the responsibility to start-up the plug-ins during initialisation of the system.

Summarising, step 1 contains the 'normal' design activity. In step 2, the diversity is analysed. The relevant service concepts that must be provided by the plug-ins are identified in step 3. Finally, step 4 introduces the infrastructure in which these services are handled.

In developing a service component framework, many factors play a role that may lead to modifications of interface, e.g. changes in the domain model, the right concepts are not chosen, etc. So, normally a couple of iterations are needed.

The invention claimed is:

1. A computer readable medium containing a computer program executable by a computer for managing a family of component systems within a medical diagnostic system and having a shared family architecture based upon commonly used generic building blocks of software, wherein said family of component systems include at least one system selected from the group consisting of application, technical and infrastructure components of an X-ray apparatus, said computer program comprising instructions for implementing:

a service component framework that comprises a skeleton of software architecture that supports participating software plug-in components;

said participating software plug-in components that each provide one or more services, wherein the one or more services correspond to one or more functionalities specific to the corresponding software plug-in component, further wherein the one or more functionalities include aspects of use and control of the application, technical and infrastructure components of the X-ray apparatus that are modeled as the one or more services; and roles defined by the service component framework for providing one or more common interfaces for communication of said services of several said software plug-in components, wherein the service component framework is further configured for actively connecting said common interfaces of said software plug-in components and providing, via respective said roles, the functionality of the interfaces to clients, the clients being configured for using the functionality provided by the service component framework and said software plug-in components as a whole, without the service component framework revealing specific configurations of the software plug-in components to the client.

2. The computer readable medium as claimed in claim 1, wherein the component framework further includes an inventory function for assessing available services in the participating software plug-in components.

3. The computer readable medium as claimed in claim 2, wherein the inventory function includes initializing the one or more services.

4. The computer readable medium as claimed in claim 2, wherein the inventory function assesses available services at initialization of the at least one system or during run-time of the at least one system.

5. The computer readable medium as claimed in claim 2, wherein the inventory function maintains a list of the available services.

* * * * *